Figure 1:
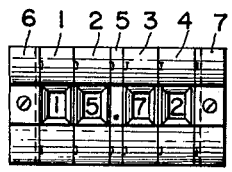

Oct. 29, 1963   J. R. MACINTYRE ETAL   3,109,167
ELECTROMAGNETIC INDICATING APPARATUS
Filed April 26, 1962   3 Sheets-Sheet 1

INVENTORS
JOHN R. MACINTYRE
BY RAYMOND J. MILLER

Irving M. Freedman
THEIR ATTORNEY

United States Patent Office 3,109,167
Patented Oct. 29, 1963

3,109,167
ELECTROMAGNETIC INDICATING APPARATUS
John R. MacIntyre, Peabody, Mass., and Raymond J.
Miller, Ithaca, N.Y., assignors to General Electric Company, a corporation of New York
Filed Apr. 26, 1962, Ser. No. 190,329
7 Claims. (Cl. 340—325)

The subject invention relates to an improved electromagnetic positioning or indicating apparatus, and more particularly, to an improved electromagnetic indicator of the type which is deflected to discrete angularly spaced positions in response to electrical excitation.

It is known to utilize the magnetic interaction of a rotatably supported magnetic rotor and a plurality of selectively energized spaced electromagnetic coils to provide a plurality of discrete angularly spaced rotor positions for the selective display of any one of a plurality of discrete indicia. For example, the rotor may selectively position an indicating wheel to exhibit any one of ten digits or other idicia. However, a ten-digit indicating wheel requires the provision of a like number of resultant magnetic fields through the magnetic interaction of the magnetic rotor and the selectively energized electromagnet coils.

It has been the practice to provide one or more spatially separated electromagnetic coils for each discrete indicia to be displayed, necessitating a relatively large number of electrical leads and components in indicators which are often required for certain applications to be as small, light-weight, and reliable as possible.

In addition, it is desirable in such electromagnetic positioning devices to provide rest or lock positions for the rotor after the coils are de-energized. The lock positions permit the development of substantial rotational torque for the next rotor position, even if a rotor position of 180° displaced from that indicated is subsequently required. One prior art arrangement utilizes a static magnetic lock member for each indicating position of the indicator. The multiplicity of coils, lock members, and associated leads not only makes it diffcult to minimize the size and weight of the indicator, but provides problems in component placement and the relative manufacturing tolerances involved.

It is an object of the subject invention to provide an improved yet simplified electromagnetic indicating apparatus to provide a plurality of discrete angularly spaced indicating positions.

It is another object of the subject invention to provide an improved electromagnetic indicating apparatus for displaying a plurality of discrete indicia which minimizes the number of parts and electrical connections required and the size and weight of the apparatus.

It is yet another object of the subject invention to provide an improved electromagnetic indicating apparatus for displaying a plurality of discrete indicia through the rotation of a magnetic rotor mounted in an improved manner.

It is still another object of the subject invention to provide an improved electromagnetic indicating apparatus which is uncomplex in structure and which minimizes the manufacturing tolerances and cost.

Further objects and advantages of the invention will become apparent as the following description proceeds, and the features of novelty which characterize the invention will be pointed out with particularity in the claims annexed to and forming a part of this specification.

In accordance with the invention, a magnetic rotor having diametrically opposed pole tips is rotatably supported for deflection about its axis to a plurality of discrete angularly spaced positions. One or more electromagnetic coils are positioned about the rotor axis with the coil axes extending radially in a direction substantially perpendicular to the axis of said rotor. A sharply defined static magnetic lock member is positioned contiguous to the axis of each coil and radially extends in a direction substantially perpendicular to the axis of the rotor. Means are provided to energize a selected coil with an electrical signal of selected polarity to deflect the magnetic rotor to a first angular position in accordance with the position of the coil energized and the polarity of energization. Upon de-energization of the coil the rotor assumes a discrete angular position adjacent to the first angular position through the modifying interaction of the rotor and the static magnetic member contiguous to the axis of the energized coil, whereby each coil and associated static magnetic member provides two diametrically opposed positions for said rotor.

More particularly, the coils are positioned around magnetic cores and the magnetic lock members extend radially inwardly closer to the axis of the rotor than the cores. A magnetic cylindrical shield member surrounds the cores and the magnetic lock members extend radially inwardly from the cylindrical member.

Also, the rotor may be of the permanent magnet type and separated from a magnetic plate member secured to the indicating apparatus housing by a pivot shaft, one end of which cooperates with a bearing surface on said rotor and the other end of which is secured to the housing. The magnetic attraction between the permanent magnetic rotor and the magnetic plate urges the rotor assembly toward the shaft.

The indicia to be indicated may be displayed by a wheel deflected in accordance with the deflection of the rotor and viewable through an aperture in the housing.

Figure 2:
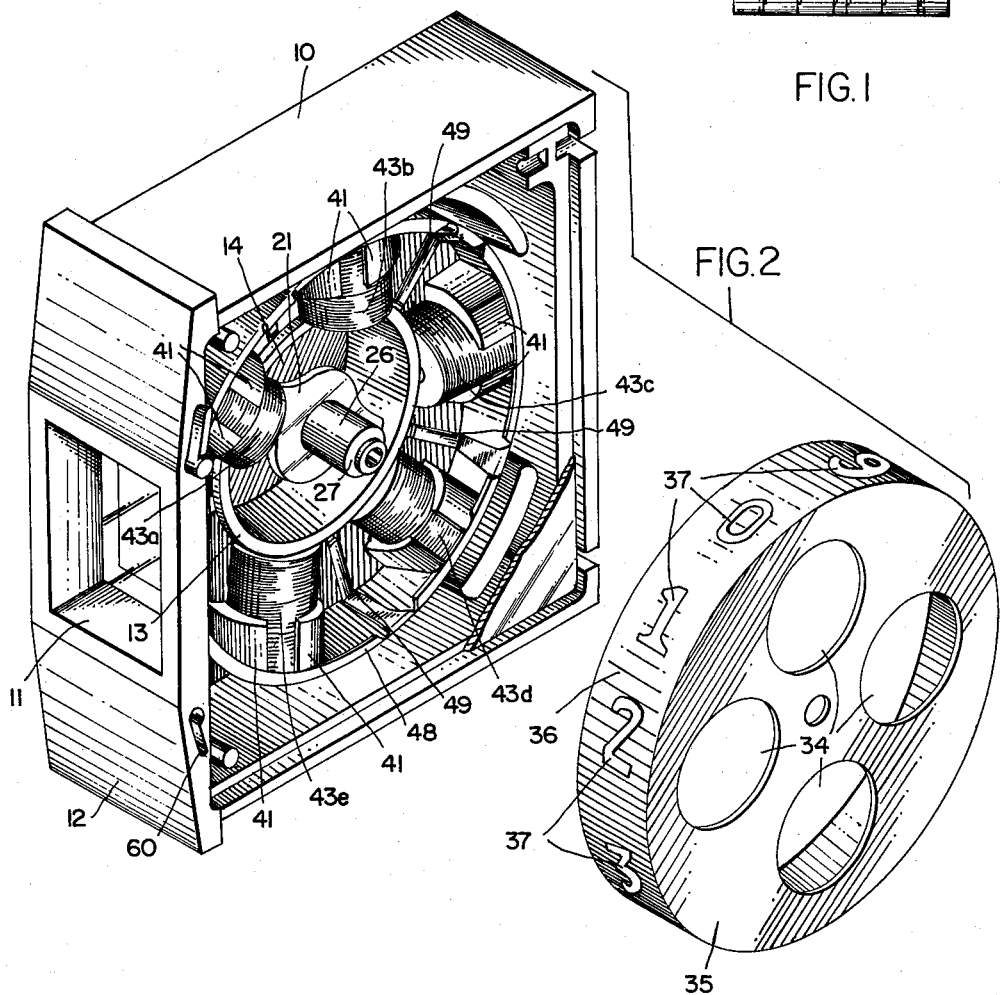
Figure 3:
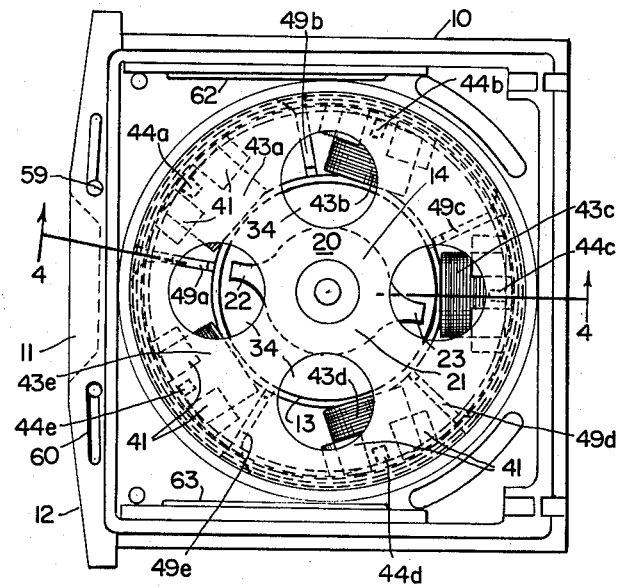
Figure 4:
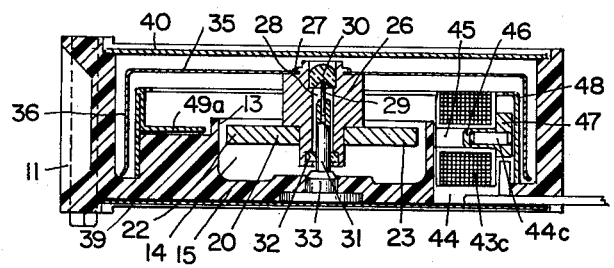
Figure 6:
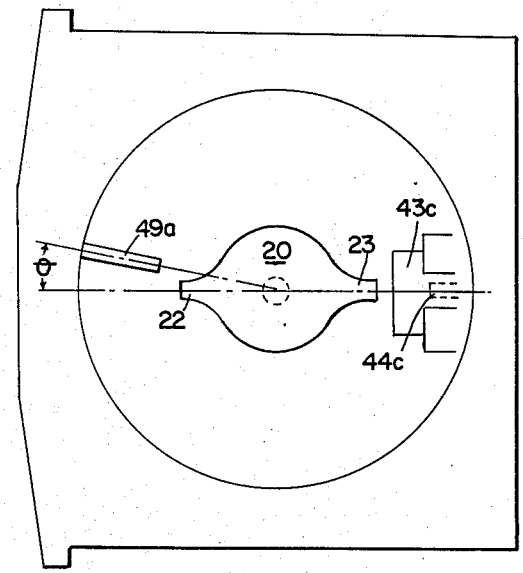
Figure 5:
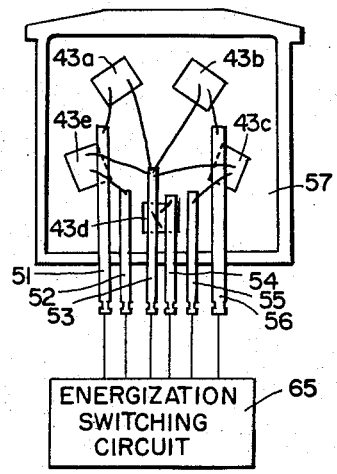

For a better understanding of this invention, reference may be had to the accompanying drawings in which:

FIG. 1 is a front view showing the combination of a plurality of indicating apparatus constructed in accordance with the subject invention, FIG. 2 is a perspective view, partially exploded, and with the cover removed, showing an indicator constructed in accordance with the subject invention, FIG. 3 is a side view of the indicator shown in FIG. 2, FIG. 4 is a sectional view of the indicator shown in FIGS. 2 and 3 taken along the line 4—4 of FIG. 3, FIG. 5 is a schematic and simplified drawing with parts omitted for clarity illustrating the electrical connections to the coils of the indicator; and FIG. 6 is a side view of the indicator, similar to FIG. 2 but with parts omitted for clarity, illustrating the energized position of the rotor and useful in explaining the operation of the indicator.

FIGS. 1 and 5 are shown on a reduced scale.

Referring to the drawings, and in particular at this time to FIGS. 2, 3, and 4, a housing 10 is shown molded of a suitable plastic, and including a viewing aperture 11 extending through the front wall 12. A cup-shaped opening 14 is formed in the central region of the housing by cylindrical wall 13 extending from the inner wall 15 molded integral with the housing. A permanent magnet rotor 20 having a circular central section 21 and diametrically opposed extending pole tips 22 and 23, respectively, is rotatably mounted in the cup-shaped opening 14. A hub 26 is secured to and passes through the circular central section 21 of the rotor forming a shoulder 27 at the outer end thereof. A central bore 28 extends axially through the hub 26 supporting a V-type jeweled bearing cup assembly 30 secured in the outer end thereof remote from wall 15. A shaft 31 secured at one end to the wall 15 has a pivot 29 at the other end to cooperate with bearing 30 in supporting the rotor 20. A ring type Teflon bearing 32 is secured to the interior of hub 26 on the other side of rotor 20 and surrounds the shaft 31 allowing the rotor to deflect freely about the shaft without angular misalignment. Bore 28 between the bearings is filled with a damping fluid, such as a suitable silicone oil, to provide desired rotor assembly response characteristics.

A cup-shaped, light-weight, aluminum indicating wheel 35 is attached to the shoulder 27 of the hub 26 for rotation with the rotor 20 and includes a circumferential wall surface 36 concentrically surrounding the hub 26 and rotor 20. Holes 34 reduce the inertia of the wheel. The indicia to be displayed, such as numerals or digits 37, are applied to the outside of the circumferential wall surface 36 by suitable means such as by painting.

A magnetic plate member 39 overlies the outside surface of the inner wall 15 of the housing 10 adjacent the cup-shaped cavity 14 in which the magnetic rotor 20 is mounted. The mangetic attraction between the rotor 20 and the magnetic plate member 39 draws the entire rotor assembly including the hub 26 and indicating wheel 35 toward the plate member such that the pivot of the shaft 31 bears against the V jeweled bearing cup 30 to magnetically maintain the rotor assembly in proper alignment for all positions of the indicator. Such an arrangement not only minimizes parts, but facilitates the assembly and alignment of the rotor assembly. A second magnetic plate member 40 forms a cover for the other side of housing 10. Plate member 40 is further from the magnetic rotor 21 than is the plate member 39 and therefore the effect of plate 39 predominates and magnetically maintains the rotor assembly in the desired position. The two plate members shield the device from the influence of external magnetic fields.

Cast integral with the housing 10 about the cylindrical wall 13 which surrounds the cup-shaped rotor cavity 14 are five pairs of coil support members 41. The coil support members 41 are equally spaced about a circle having the rotor shaft 31 as an axis. Cylindrical, insulated coils 43 are inserted through openings 44 of the housing 10 and cemented into place within the openings to the coil support members 41. Magnetic cores 44 (see FIGS. 3 and 4) extend a short distance through the central bore 45 of the coils 43 in the region remote from the rotor 20 to increase the magnetic flux provided by the coils. The cores 44 are embedded in a T-shaped plastic member 46 and are positioned within the coils prior to the mounting of the coils on the housing 10. The orthogonal extensions 47 of the plastic members 46 prevent the cores from falling into the central bores 45 toward the rotor 20.

A cylindrical, magnetic member 48, as best shown in FIGS. 2 and 4, surrounds the coils 43, cores 44, and coil support members 41 retaining the cores in position and providing both a magnetic flux return path and magnetic shielding for the indicator. Five equally spaced, sharply-defined, static magnetic lock member tabs 49 are formed by punching out portions of the surface of the cylindrical member 48 and bending the punched-out portions to extend radially inwardly from the cylindrical member and perpendicular to the axis of the shaft 31 of the rotor assembly. As best shown in FIG. 4, the lock members extend radially inwardly closer to the pole tips 22 and 23 of the rotor 20 than do the cores 44.

Upon energization of a particular coil, for example coil 43c (see FIG. 6), the rotor 20 will deflect to the position shown in which the diametrically opposed pole tips 22 and 23 are substantially in alignment with the axis of coil 43c and the core 44c. The polarity of the signal applied to coil 43c will determine whether pole tip 22 or pole tip 23 will be adjacent to the coil.

Upon de-energization of the indicator through de-energization of coil 43c, the rotor 20 will move through a small angle indicated as "θ" in FIG. 6, which angle is determined by the positioning and hence the combined effects of the magnetic lock member 49a and the core 44c, in combination with the permanent magnet rotor 20. Since the magnetic lock member 49a extends closer to the rotor 20, its affect on the alignment of the rotor with de-energized coils will be greater, and the rotor will assume a position shown in FIG. 3 in which the pole tips 22 and 23 are pretty much in alignment with the lock member 49a. Under such conditions an appropriate numeral 37 will be positioned so as to be visible through the viewing aperture 11.

The combined effects of the lock member 49a and the core 44c will maintain the rotor 20 in the position shown in FIG. 3 until the subsequent energization of the indicator. If the subsequent energization should require a 180° reversal of the rotor 20 through a reversal of polarity of the previous signal applied to coil 43c substantial rotational torque will be developed between the magnetic fields of the permanent magnet rotor 20 and that provided by the coil. Since the rotor in the locked position is not aligned with the core 44c of the coil 43c in the de-energized position, zero or low torque positions are avoided. It is to be noted that the lock member 49a extends radially inwardly toward the rotor axis, along a line contiguous to the axis of coil 43c, and there is a lock member 49 similarly associated with each coil 43.

FIG. 5 illustrates in somewhat schematic form the manner of providing electrical connections to the coils. Six electrical connectors, 51 through 56 respectively, are fastened to the outside of an insulatinng cover member 57. One lead from each coil 43a through 43e is connected to the common connector 53, while the other lead from each coil is connected individually to a separate connector. Thus, a ten-digit indicator requires only six electrical connectors and accordingly six external leads, only five coils, and only five magnetic lock members. Since the angular positioning of the lock members 49 and the cores 44 determine the discrete, angularly spaced positions which the rotor 20 assumes to display the indicia 37 through the window 11, it will be appreciated that manufacturing tolerances and problems of relative placement of the magnetic components have been minimized by minimizing the number of effective components.

The connectors 51—56 are connected to an electrical energization switching circuit indicated by block 65. Any suitable switching circuit providing means to supply direct current pulses of sufficient amplitude and selected polarity between the common electrical connector 53 and the selected coil may be used. A suitable arrangement by way of example is disclosed in the article entitled "Binary-to-Decimal Display Uses Magnetic Stepping," by Raymond J. Miller, which appeared in the April 28, 1961, issue of Electronics magazine.

It is often desirable and/or necessary to provide an assembly comprising a plurality of electromagnetic indicators of the type described above for display, for example, of multidigit numbers. FIG. 1 shows a four-digit assembly comprising indicators 1, 2, 3, and 4, respectively. Indicators 1 and 2 are separated from indicators 3 and 4 by a spacer member 5 bearing a decimal point indicia. Plastic end member 6 and 7 are positioned alongside the outside of indicators 1 and 4. The stacking of the units is facilitated by pins 59 and slots 60 along the edges of the front wall 12 which mate with corresponding slots and pins (not shown) of adjacent units. If a plurality of units are stacked, a stiffening rod (not shown) may be inserted through aligned axial holes in the front wall 12 of the individual indicators.

If desired and/or required, electroluminescent lighting panels 62 and 63 may be positioned within the housing 10 as shown in FIG. 3 to illuminate the viewing aperture 11.

Therefore, while a particular embodiment of the subject invention has been shown and described herein, it is in the nature of description rather than limitation, and it will occur to those skilled in the art that various changes, modifications, and combinations may be made within the province of the appended claims without departing either in spirit or scope from this invention in its broader aspects.

What we claim as new and desire to secure by Letters Patent of the United States is:

1. Electromagnetic indicating apparatus for displaying a plurality of discrete indicia in response to electrical energization comprising: a magnetic rotor having diametrically opposed poles rotatably supported for deflection about the axis thereof to a plurality of discrete angularly spaced positions, one or more electromagnetic coils, the coils being positioned about said rotor axis with their axes extending radially in a direction substantially perpendicular to the axis of said rotor, a sharply defined static magnetic lock member contiguous to the axis of each coil and extending radially in a direction substantially perpendicular to the axis of said rotor, and means to selectively energize one of said coils at a time with a electrical signal of either of two opposed polarities, said magnetic rotor being deflected to a first angular position in accordance with the position of the coil energized and the polarity of energization, and said rotor upon de-energization of said coil assuming a discrete angular position adjacent to the first angular position by the modifying interaction of the rotor and the static magnetic member extending along a line contiguous to the axis of the previously energized coil, whereby each coil and associated static magnetic member provides two diametrically opposed positions for said rotor.

2. Electromagnetic indicating apparatus for displaying a plurality of $n$ discrete indicia in response to electrical energization comprising: a magnetic rotor having diametrically opposed poles rotatably supported for deflection about the axis thereof to a plurality of $n$ discrete angularly spaced positions, a plurality of only $n/2$ electromagnetic coils, the coils being positioned about said rotor axis around magnetic cores extending radially in a direction substantially perpendicular to the axis of said rotor, a sharply defined static magnetic lock member contiguous to the axis of each coil and extending radially in a direction substantially perpendicular to the axis of said rotor, and means to selectively energize one of said coils at a time with an electrical signal of either of two opposed polarities, said magnetic rotor being deflected to a first angular position in accordance with the position of the coil energized and the polarity of energization, and said rotor upon de-energization of said coil assuming a discrete angular position adjacent to the first angular position by the modifying interaction of the rotor and the static magnetic member extending along a line contiguous to the axis of the previously energized coil, whereby each coil and associated static magnetic member provides two diametrically opposed positions for said rotor.

3. Electromagnetic indicating apparatus for displaying a plurality of $n$ discrete indicia in response to electrical energization comprising: a permanent magnet rotor having diametrically opposed poles rotatably supported for deflection about the axis thereof to a plurality of $n$ discrete angularly spaced positions, a plurality of only $n/2$ electromagnetic coils, the coils being positioned about said rotor axis around magnetic cores extending radially in a direction substantially perpendicular to the axis of said rotor, a plurality of only $n/2$ sharply defined static magnetic lock members each being positioned contiguous to the axis of a corresponding one of said coils on the opposite side of said axis from its corresponding coil and extending radially in a direction substantially perpendicular to the axis of said rotor, each of said magnetic lock members extending radially inwardly closer to the axis of said rotor than the corresponding one of said magnetic cores, and means to selectively energize one of said coils at a time with an electrical signal of either of two opposed polarities, said magnetic rotor being deflected to a first angular position in accordance with the position of the coil energized and the polarity of energization, and said rotor upon de-energization of said coil assuming a discrete angular position adjacent to the first angular position by the modifying interaction of the rotor and the static magnetic member corresponding to the previously energized coil, whereby each coil and its corresponding static magnetic member provides two diametrically opposed positions for said rotor.

4. Electromagnetic indicating apparatus for displaying a plurality of $n$ discrete indicia in response to electrical energization comprising: a permanent magnet rotor having diametrically opposed poles rotatably supported for deflection about the axis thereof to a plurality of $n$ discrete angularly spaced positions, a plurality of only $n/2$ electromagnetic coils, the coils being positioned about said rotor axis around magnetic cores extending radially in a direction substantially perpendicular to the axis of said rotor, a cylindrical magnetic member surrounding said coils, a plurality of only $n/2$ sharply defined static magnetic lock members each being positioned contiguous to the axis of a corresponding one of said coils and extending radially from said magnetic rim on the opposite side of said axis from its corresponding coil in a direction substantially perpendicular to the axis of said rotor, each of said magnetic lock members extending radially inwardly closer to the axis of said rotor than the corresponding one of said magnetic cores, and means to energize one of said coils at a time with an electrical signal of either of two opposed polarities, said magnetic rotor being deflected to a first angular position in accordance with the position of the coil energized and the polarity of energization, and said rotor upon de-energization of said coil assuming a discrete angular position adjacent to the first angular position by the modifying interaction of the rotor and the static magnetic member corresponding to the previously energized coil, whereby each coil and its corresponding static magnetic member provides two diametrically opposed positions for said rotor.

5. Electromagnetic indicating apparatus for displaying a plurality of $n$ discrete indicia in response to electrical energization comprising: a housing including a viewing aperture therethrough, a permanent magnet rotor having diametrically opposed poles rotatably supported within said housing for deflection about the axis thereof to a plurality of $n$ discrete angularly spaced positions, a wheel bearing $n$ indicia which is deflected in accordance with the deflection of said rotor and having the indicia displayed through said window, a plurality of only $n/2$ electromagnetic coils, the coils being positioned about said rotor axis around magnetic cores extending radially in a direction substantially perpendicular to the axis of said rotor, a cylindrical magnetic rim member surrounding said coils, a plurality of only $n/2$ sharply defined static magnetic lock members each being positioned contiguous to the axis of a corresponding one of said coils and extending radially from said magnetic rim on the opposite side of said axis from its corresponding coil in a direction substantially perpendicular to the axis of said rotor, each of said magnetic lock members extending radially inwardly closer to the axis of said rotor than the corresponding one of said magnetic cores, and means to selectively energize one of said coils at a time with an electrical signal of either of two opposed polarities, said magnetic rotor being deflected to a first angular position in accordance with the position of the coil energized and the polarity of energization, and said rotor upon de-energization of said coil assuming a discrete angular position adjacent to the first angular position by the modifying interaction of the rotor and the static magnetic member corresponding to the previously energized coil, whereby each coil and its corresponding static magnetic member provides two diametrically opposed positions for said rotor.

6. Electromagnetic indicating apparatus for displaying a plurality of $n$ discrete indicia in response to electrical energization comprising: a permanent magnet rotor assembly having diametrically opposed poles rotatably supported within a housing for deflection about the axis thereof to a plurality of $n$ discrete angularly spaced positions, a plurality of only $n/2$ electromagnetic coils, the coils being positioned about said rotor axis with their axes extending radially in a direction substantially perpendicular to the axis of said rotor, a plurality of only $n/2$ sharply defined static magnetic lock members each being positioned contiguous to the axis of a corresponding one of said coils on the opposite side of said axis from its corresponding coil and extending radially in a direction substantially perpendicular to the axis of said rotor, and means to selectively energize one of said coils at a time with an electrical signal to either of two opposed polarities, said magnetic rotor being deflected to a first angular position in accordance with the position of the coil energized and the polarity of energization, and said rotor upon de-energization of said coil assuming a discrete angular position adjacent to the first angular position by the modifying interaction of the rotor and the static magnetic member corresponding to the previously energized coil, whereby each coil and its corresponding static magnetic member provides two diametrically opposed positions for said rotor, said rotor support comprising a pivot shaft secured at one end to said housing, a bearing on said rotor cooperating with the other end of said pivot shaft, and a magnetic member secured to said housing contiguous to said rotor providing a magnetic attraction between said permanent magnet rotor and said magnetic member, whereby said rotor assembly is urged toward said pivot shaft.

7. Electromagnetic indicating apparatus for displaying a plurality of $n$ discrete indicia in response to electrical energization comprising: a permanent magnet rotor assembly having diametrically opposed poles rotatably supported within a housing for deflection about the axis thereof to a plurality of $n$ discrete angularly spaced positions, a plurality of only $n/2$ electromagnetic coils, the coils being positioned about said rotor axis around magnetic cores extending radially in a direction substantially perpendicular to the axis of said rotor, a plurality of only $n/2$ sharply defined static magnetic lock members each being positioned contiguous to the axis of a corresponding one of said coils on the opposite side of said axis from its corresponding coil and extending radially in a direction substantially perpendicular to the axis of said rotor, each of said magnetic lock members extending radially inwardly closer to the axis of said rotor than the corresponding one of said magnetic cores, and means to selectively energize one of said coils at a time with an electrical signal of either of two opposed polarities, said magnetic rotor being deflected to a first angular position in accordance with the position of the coil energized and the polarity of energization, and said rotor upon de-energization of said coil assuming a discrete angular position adjacent to the first angular position by the modifying interaction of the rotor and the static magnetic member corresponding to the previously energized coil, whereby each coil and its corresponding static magnetic member provides two diametrically opposed positions for said rotor, said rotor support comprising a pivot shaft secured at one end to said housing, a bearing on said rotor cooperating with the other end of said pivot shaft, and a magnetic member secured to said housing contiguous to said rotor providing a magnetic attraction between said permanent magnet rotor and said magnetic member, whereby said rotor assembly is urged toward said pivot shaft.

References Cited in the file of this patent
UNITED STATES PATENTS

| | | |
|---|---|---|
| 2,908,900 | Gordon et al. | Oct. 13, 1959 |
| 2,943,313 | Gordon et al. | June 28, 1960 |